No. 673,540. Patented May 7, 1901.
J. B. HUMPHREYS.
TAKE-UP MECHANISM.
(Application filed May 24, 1900.)
(No Model.) 3 Sheets—Sheet 1.
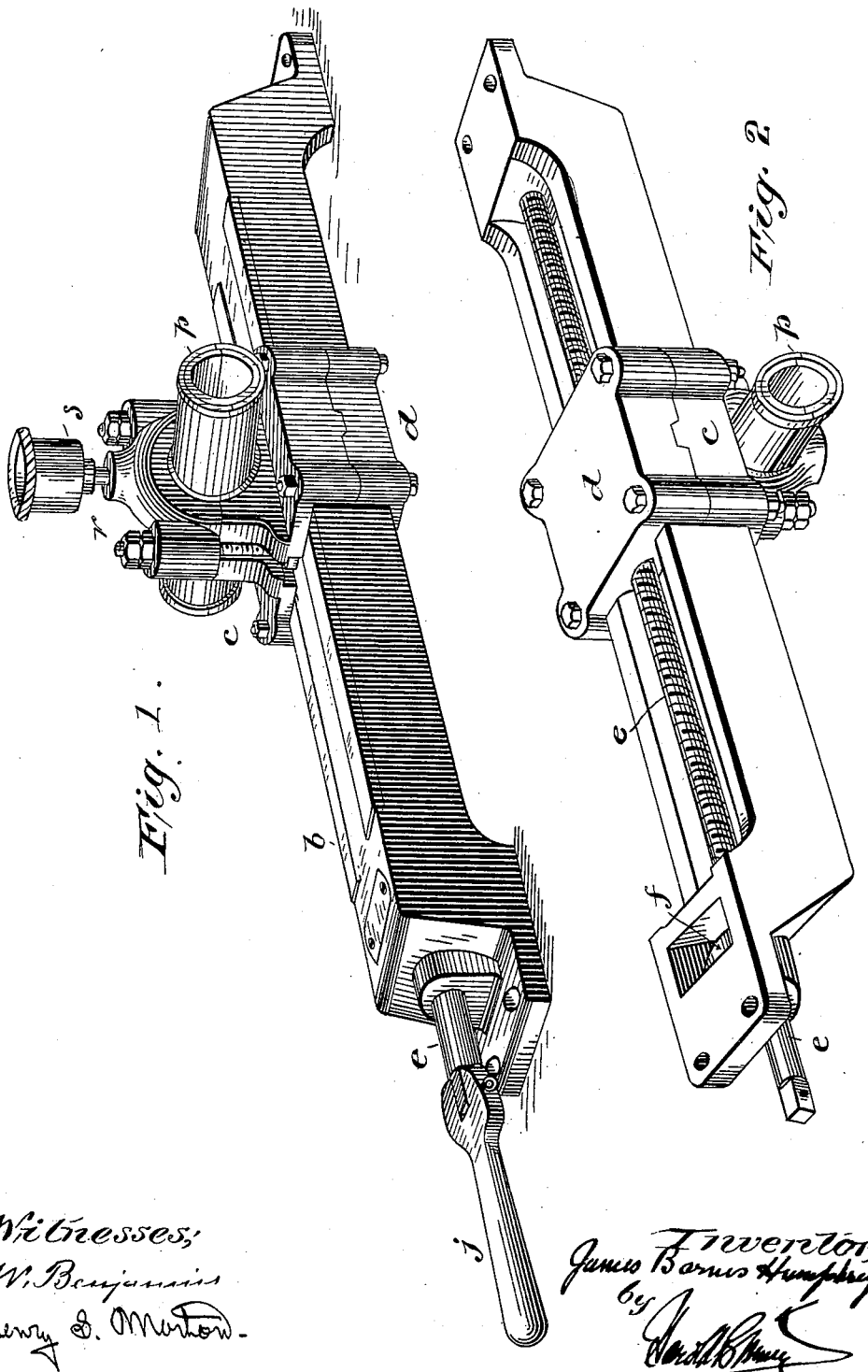

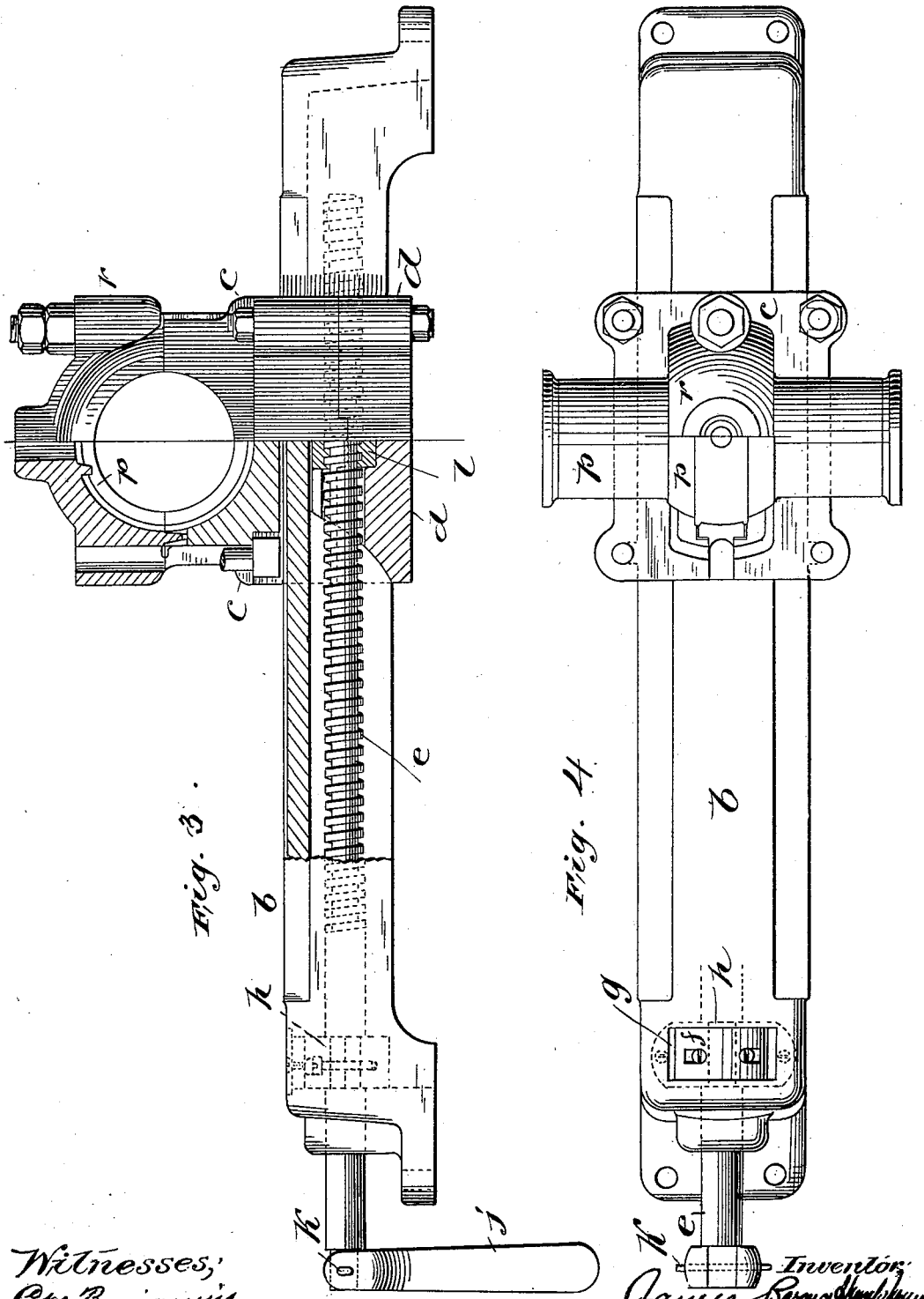

No. 673,540. Patented May 7, 1901.
J. B. HUMPHREYS.
TAKE-UP MECHANISM.
(Application filed May 24, 1900.)
(No Model.) 3 Sheets—Sheet 3.
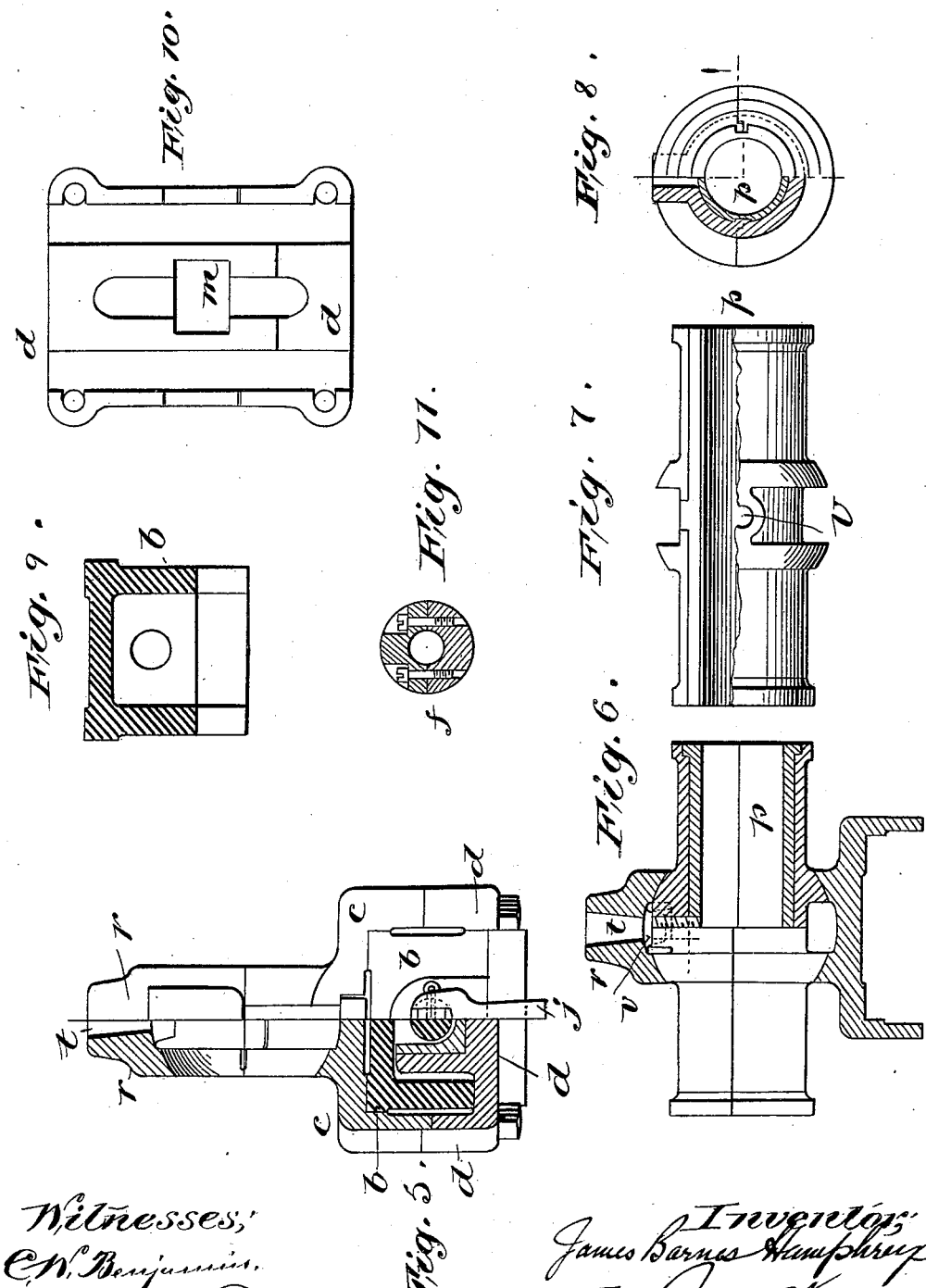

UNITED STATES PATENT OFFICE.

JAMES BARNES HUMPHREYS, OF NEW YORK, N. Y., ASSIGNOR TO THE ROBINS CONVEYING BELT COMPANY, OF NEW JERSEY.

TAKE-UP MECHANISM.

SPECIFICATION forming part of Letters Patent No. 673,540, dated May 7, 1901.

Application filed May 24, 1900. Serial No. 17,803. (No model.)

*To all whom it may concern:*

Be it known that I, JAMES BARNES HUMPHREYS, of 146 East Thirty-seventh street, in the city of New York, borough of Manhattan, and State of New York, have invented certain new and useful Improvements in Take-Up Mechanisms for Pulleys and Shafts, of which the following is a description, referring to the accompanying drawings.

The object of the invention is to improve certain forms of take-up mechanisms now in use and to protect the mechanism from injury.

The invention is of so simple a nature that it will be readily understood from the preferred form, which is shown in the accompanying drawings. In this most preferred form of the invention the screw is entirely inclosed above and at the sides by the stationary cast-iron frame and is therefore not liable to become clogged with rust or dirt. Preferably, also, the screw is provided with a toggle-wrench jointed to one of its ends.

In the preferred embodiment of the invention as shown in the drawings, Figure 1 is a perspective view of my complete mechanism. Fig. 2 is an inverted perspective view. Fig. 3 is a side elevation, partly in central section. Fig. 4 is a plan view, partly broken away, to show detail. Fig. 5 is an end view in half-section. Figs. 6, 7, and 8 are detailed views, partly in section, of the ball-and-socket bearing. Fig. 9 is a transverse section of the bed-plate or frame of the mechanism. Fig. 10 is a detailed plan view of the lower member of the traveling pillow-block, and Fig. 11 is a detail of the end-thrust collar for the screw-shaft.

The frame or bed-plate $b$ is provided with ways from which the traveling pillow-block, formed of two pieces $c$ and $d$, travels. The frame $b$ is entirely closed at the top and sides, but is open from beneath, like an inverted trough, as plainly shown in Fig. 2. The screw-shaft $e$ extends longitudinally in the trough-shaped space.

The collar $f$, formed of two pieces bolted together, as in Fig. 11, fits and is held within the correspondingly-shaped recess $g$ and surrounds the neck $h$ of the shaft. This forms the end-thrust bearing for the shaft $e$; but by separating the two parts of the collar $f$ and removing them from the shaft the shaft may be drawn out of the frame $b$ for cleaning or repair. The shaft is rotated by means of the toggle-wrench $j$, which is pivoted to the end of the shaft at $k$ and serves to conveniently rotate the shaft, even when the frame $b$ is secured directly against the floor or other flat surface.

The rotation of the shaft $e$ gives travel to the pillow-block $c$ $d$. It is screw-threaded through the nut or block $l$, which lies within the recess $m$ of the lower member $d$ of the pillow-block, Fig. 10. The block $l$ cannot move longitudinally in the recess $m$, and consequently it gives movement to the member $d$, which is bolted directly to the upper member $c$ of the pillow-block. The pillow-block forms a traveling head, which surrounds the bed or frame $b$ and receives its motion from the protected shaft $e$.

The journal-bearing $p$ is preferably of the ball-and-socket class and is held upon the pillow-block by the straps $r$, as will be understood.

Oil or grease is supplied to the bearing by a cup $s$, mounted upon the strap $r$ and delivering the lubricant through the vertical opening $t$ in the strap into the oil-hole $v$ in the ball of the bearing.

The operation of this take-up mechanism is as follows: In assembling the parts the nut $l$ is placed upon the screw-shaft $e$ and the collar $f$ put in place to hold the shaft. After the lower member $d$ of the pillow-block has been placed in position the upper member $c$ may be bolted to it. After this the journal-bearing $p$ may be put in place and secured by the strap $r$. By turning the shaft $e$ the pillow-block, and consequently the journal-bearing, may be adjusted along the bed-plate $b$ at will.

The shaft and the nut $l$ are at all times protected from dust and from injury. Workmen may walk over or may step upon the frame $b$ without chance of injury either to themselves or to the mechanism. When the collar $f$ and the nut $l$ become worn, they may be readily taken out and replaced at very small expense without necessitating the renewal of any of the other parts.

I have now described the invention in its preferred form. It is of course subject to great variation in design.

What I claim as the novel and characteristic features of the invention, by which it may be distinguished from the prior art, are as follows:

1. In combination in a take-up bearing and with the pillow-block thereof, mechanism for adjusting the pillow-block, and a frame constituting ways upon which the pillow-block travels and which frame covers and protects said mechanism, substantially as set forth.

2. In combination in a take-up bearing and with the pillow-block thereof, a screw-shaft for adjusting the pillow-block, and a frame of inverted-trough shape having ways upon which the pillow-block is mounted to travel, said frame covering and protecting said screw-shaft, substantially as set forth.

3. In combination in a take-up bearing and with the pillow-block thereof, a frame of inverted-trough shape having ways upon which the said pillow-block is mounted to travel, a screw-shaft extending in the said trough-shaped frame, and a detachable nut or head connecting the said screw to the said pillow-block, substantially as set forth.

4. In combination in a take-up bearing and with the pillow-block thereof, a frame of inverted-trough shape having ways upon which the said pillow-block is mounted to travel, a screw-shaft extending in the said trough-shaped frame, and a detachable collar fitting in the said frame and forming a thrust-bearing for the screw-shaft, substantially as set forth.

Signed this 16th day of April, 1900, at New York, N. Y.

JAMES BARNES HUMPHREYS.

Witnesses:
EDWARD A. FRESHMAN,
HAROLD BINNEY.